April 14, 1942. R. A. BOSSI 2,279,551
INDICATING MECHANISM
Filed July 24, 1940 2 Sheets-Sheet 1
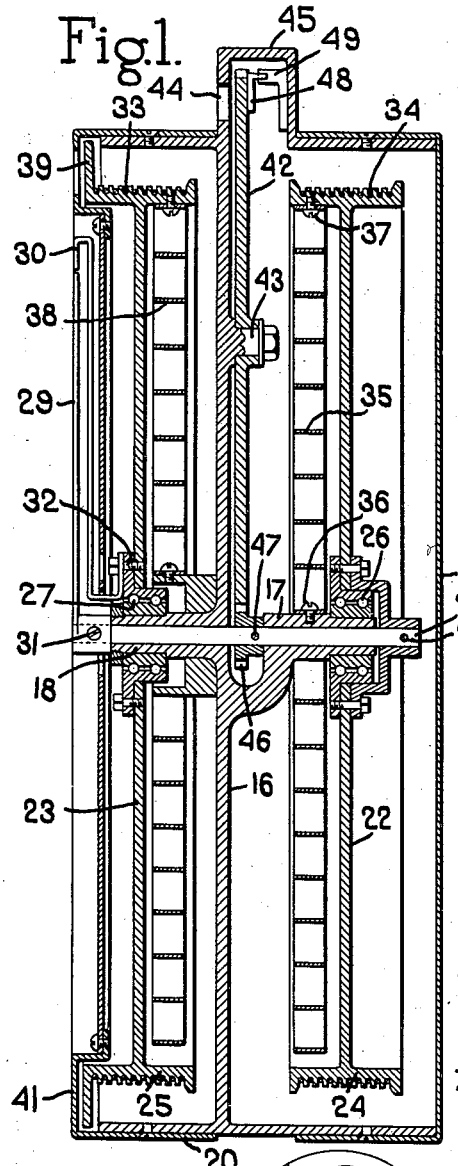
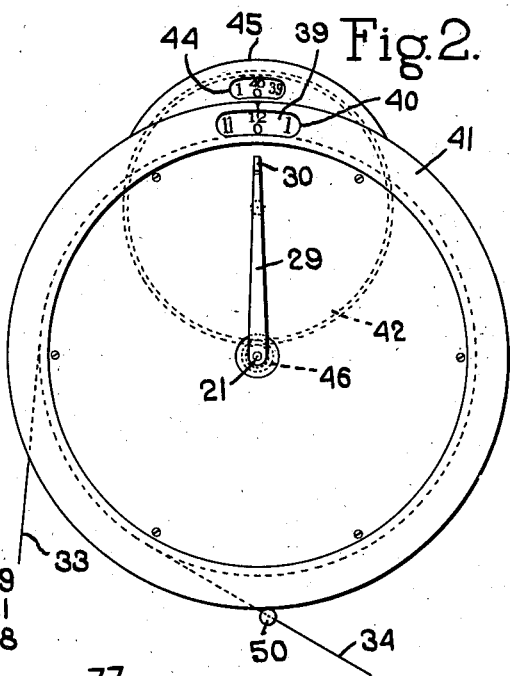
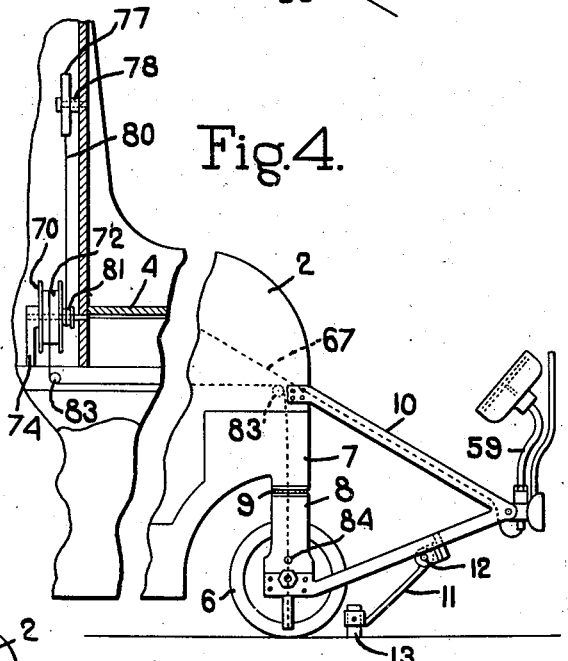
Inventor.
Romeo A. Bossi
by Heard Smith & Tennant.
Attys.

April 14, 1942.     R. A. BOSSI     2,279,551
INDICATING MECHANISM
Filed July 24, 1940     2 Sheets-Sheet 2

Inventor.
Romeo A. Bossi
by Heard Smith & Tennant
Attys.

Patented Apr. 14, 1942

2,279,551

UNITED STATES PATENT OFFICE 2,279,551

INDICATING MECHANISM

Romeo A. Bossi, Newton Center, Mass.

Application July 24, 1940, Serial No. 347,157

6 Claims. (Cl. 116—129)

This invention relates to indicating mechanism having primarily for its purpose to indicate a relative lateral position. While the apparatus of this invention may be utilized for a wide variety of purposes, it is particularly designed for embodiment in a vehicle such as employed for marking a line or painting a stripe upon a roadway and for indicating the position of the vehicle with respect to the sides or edges of the roadway thus to enable the operator accurately to mark the line or paint the stripe desired.

The invention in its preferred form embodies two cords operating respectively two indicating elements and one object of the invention is to provide means for indicating the position of the indicator or the vehicle or other object upon which it is mounted relatively to the ends of these cords when drawn taut in alignment in opposite directions laterally of the indicator.

The nature and objects of the invention will appear more fully from the accompanying description and drawings and will be particularly pointed out in the claims.

This application is a division in part of Patent No. 2,221,908, granted November 19, 1940 (application Serial No. 259,585, filed March 3, 1939). This patent discloses one form of the present invention embodied in a machine for painting along a highway a stripe such as now extensively employed for indicating traffic lines and also a means for marking a line preferably as a preliminary to the painting of the stripe. In illustrating herein embodiments of the present invention in connection with a vehicle, it is unnecessary, therefore, here to illustrate or describe in detail the construction of the vehicle itself and reference may be made to the aforesaid patent for a specific construction of vehicle suitable for embodiment therein of forms of the present invention.

Two forms of indicating mechanism embodying the broader features of the invention are disclosed herein, one of which is the same as that disclosed in the aforesaid patent of which it is a division.

In the drawings:

Fig. 1 is a vertical cross section of the main portion of an indicating apparatus of a preferred form embodying the invention.

Fig. 2 is a front elevation on a smaller scale of the apparatus shown in Fig. 1.

Fig. 3 is a side elevation of a machine for painting a stripe or marking a line on a highway of the same construction as shown in the aforesaid patent in which the details are more fully set forth and in which there is here embodied a construction of indicating mechanism illustrated in Figs. 1 and 2.

Fig. 4 is a detail partially broken away and partially in section of the forward portion of a machine or vehicle of the same type as shown in Fig. 3 but having embodied therein another form of the present invention, which form is the same as that disclosed in the aforesaid patent.

Figure 5:
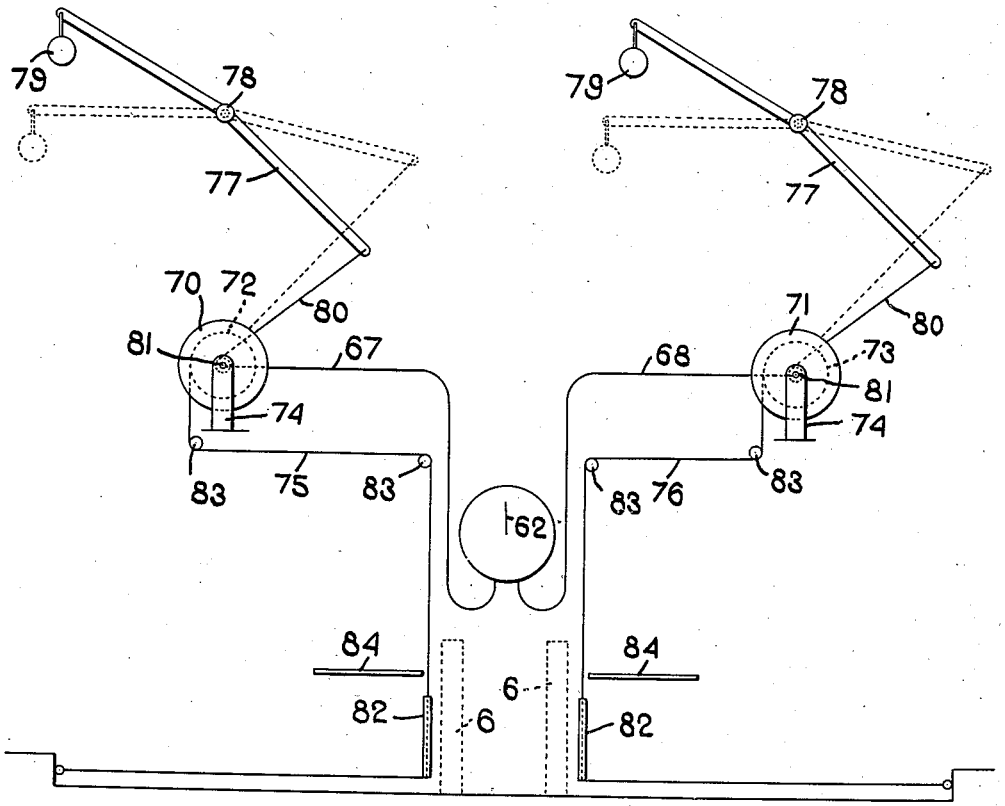
Fig. 5 is a diagrammatic illustration of the means embodied in Fig. 4 for indicating the desired position of the vehicle or machine with respect to the sides of the roadway, particularly for marking the line or the painted stripe to be applied.

The preferred forms of the invention herein disclosed are particularly illustrated in connection with the highway striping or marking vehicle or machine referred to. Such a vehicle as shown in Figs. 3 and 4 and more in detail in the aforesaid patent is self-propelled and may be driven along the highway, occupying a minimum amount of space, and guided so as rapidly and accurately to mark a line or to apply the required painted stripe either continuous or in required spaced sections throughout any desired length and in accordance with any variation in the direction of the roadway.

Such a vehicle comprises two body sections, a rear body section 1 and a front body section 2. The rear body section is provided with the supporting wheels 3 driven in the same manner as an ordinary automobile or in any other suitable way. The front section 2 which carries the seat 4 for the driver and the steering wheel 5 is provided with a pair of supporting wheels 6 maintained at all times parallel with the longitudinal axis of the front section and preferably these wheels are spaced apart the width of the desired stripe and act to define the stripe painted upon the roadway. The front section 2 pivots upon a central vertical axis midway of the supporting wheels and for that purpose the rear body section is shown extending forward and presenting a head 7 between the upper portion of the front section and the yoke 8 in which is journalled the front wheels 6 with the ball bearing 9 between the yoke 8 and the head 7. It will thus be seen that the vehicle is steered by the turning of the front section of the body upon the central vertical axis and that thus the driver's seat or the position occupied by the driver is always directly in line with the point at which the stripe is being formed on the roadway and consequently the driver is always in a position to guide the vehicle along the required position of the stripe and observe the painting thereof when paint is applied between the front supporting wheels 6. Any suitable means may be employed for supplying the paint and a preferred form of such means is disclosed in the aforesaid patent and consequently forms no part of the present invention.

Such a vehicle may also be employed for making a mark, temporary or otherwise, on the roadway as for the purpose of serving as a guide to the subsequent making of the painted stripe. For this purpose the front body section 2 is shown as provided with a forwardly projecting frame 10 secured at its lower end to the yoke 8 and at its upper end to the upper portion of the front section. This frame is rigid with the front body section and symmetrically disposed laterally with respect to its longitudinal axis. An arm 11 is shown hinged at 12 to the frame 10 and has adjustably mounted in its lower end a block 13 of suitable marking material, such, for example, as soapstone. Theoretically this block 13 should be positioned midway between the supporting wheels 6 but for ordinary purposes a position slightly in advance has little effect upon the accuracy of the markings. The arm 11 is mounted to swing in a vertical plane in line with or parallel with the central longitudinal axis of the front body section and it may be swung and held upward on the frame when not in use.

The indicator proper 14 embodying a preferred form of the invention shown in Figs. 1 and 2 is conveniently mounted on a central support 15 carried at the forward end of the frame 10 and positioned so that it stands facing the driver of the vehicle and on the longitudinal axis of the front section. Thus it will be seen that the indicator turns with the front section about the central vertical axis upon which the front body section is pivoted to the rear body section of the vehicle.

In the construction shown in Figs. 1 and 2, the indicator comprises a central frame 16 having the central aligned bearings 17 and 18. Casing members 19 and 20 fit over this frame at the rear and front and enclose the mechanism. A shaft 21 is journalled in the bearings 17 and 18. Two pulleys 22 and 23 are provided each having a cylindrical flange 24 and 25, preferably of the same diameter and each provided with a spiral groove to receive a cord. The pulley 22 rotates on the exterior of the bearing 17 with an interposed ball bearing 26 and similarly the pulley 23 rotates on the exterior of the bearing 18 with an interposed ball bearing 27. The pulley 22 is attached at 28 to the shaft 21 and consequently rotates with the shaft 21 while the pulley 23 rotates with respect to the shaft 21. Two indicating elements are shown in the form of superimposed pointers 29 and 30, the former being secured directly to the shaft 21 at 31 and the latter being secured to the pulley 23 at 32. Thus it will be seen that there is a direct driving connection between the pulley 22 and the pointer 29 and a direct driving connection between the pulley 23 and the pointer 30 acting to effect in each case an angular movement of the pointer.

A cord 33 is attached to and wound around in the helical groove of the flange 25 of the pulley 23 and another cord 34 is similarly attached to and wound around in the helical groove of the flange 24 of the pulley 22. Consequently when these cords are pulled and held taut, the corresponding pointers will rotate or have an angular movement depending upon the extent to which the cords are pulled and thus the pulleys are rotated. When the cords are pulled out to the same extent, since the flanges of the pulleys are of the same diameter, there will be no change in the relative angular position of the pointers, while if they are pulled to an unequal extent, the differential will be indicated by the change in the relative angular position of the pointers.

Suitable take-up means are provided to effect reverse rotation of the pulleys and thereby of the indicating means and thus enable the cords to be maintained taut. For that purpose the pulley 22 is provided with a concentric helical spring 35 attached at its inner end at 36 to the bearing 17 and at its outer end at 37 to the flange, and a similarly located helical spring 38 is provided for the pulley 23.

The construction illustrated in Figs. 1 and 2 also provides a means for indicating in linear units the position of the indicator and consequently of the object upon which it is mounted with respect to the ends of the cords. For this purpose an annulus is provided associated with and rotated with each pulley and calibrated on its face in linear units. The pulley 23 at the front of the indicator is shown as provided with a peripheral annular flange 39 graduated on its face in suitable linear units visible as the pulley rotates through an opening 40 in the face 41 of the casing member 20. Since the pulley 22 is located behind the pulley 23, the second annulus with the calibrations in linear units on its face is formed by the peripheral portion of a dial 42 journalled at 43 on the frame 16 with its periphery extending beyond the annulus 39 and with the calibrations visible through an opening 44 in the face of an extension 45 of the casing. This dial is provided with a toothed peripheral edge and meshes with a pinion 46 secured at 47 to the shaft 21 and consequently rotating with the pulley 22.

The annuluses will be graduated according to the purposes for which they are used. The annulus on the dial 42 is shown as graduated in feet, beginning with zero and ending with 40, and thus allowing for the corresponding cord to be drawn out to a length of forty feet. The annulus 39 is shown as graduated in inches and in four sections of one foot each with each rotation of the pulley 23 representing four feet of the cord drawn up.

The return of the respective pulleys to the zero point may be secured in any suitable way. For the pulley 22 a stop finger 48 comes into engagement with a stop finger 49 on the casing, while for the pulley 23 the cord 34 is provided with a button 50 coming against the frame.

Figure 6:
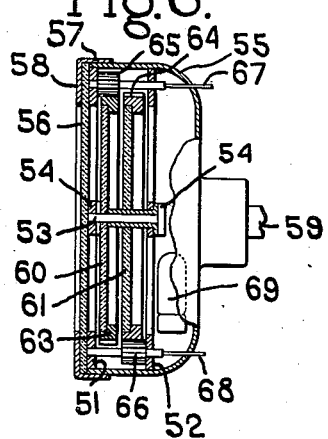
Fig. 6 is a view chiefly in cross section and Fig. 7 is a view in front elevation of the main portion of the indicating means of the type shown in Figs. 4 and 5 and in the aforesaid patent and embodying the second form of the present invention.
Figure 7:
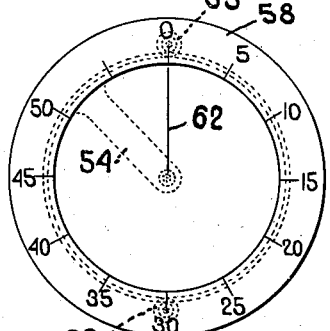

In the second form of the invention illustrated more particularly in Figs. 5, 6 and 7, the indicator comprises a frame made up of annular plates 51 and 52 with a central pivot 53 supported in a radially extending arm 54. The mechanism is enclosed in a suitable casing 55 having at the front a transparent or glass plate 56 held in place by a casing section 57 presenting at the front an annulus 58. The casing at the rear is formed with a suitable support 59 by which it may be mounted centrally on the frame

10, as shown in Fig. 4. The two indicating elements are superimposed and rotatable on the pivot 53 or common center and are shown as glass disks 60 and 61 each having an indicating mark 62 thereon constituting a pointer. These glass disks are secured in frames 63 and 64 provided with peripheral gear teeth engaging respectively pinions 65 and 66 operated by flexible shafts 67 and 68 and these pinions are journalled in the annular plates 51 and 52. A lamp 69 fed from a suitable source of electricity is located in the casing at the rear and thus illuminates the indicator and enables the driver to see the position of the pointer 62. The face of the annulus 58 is graduated in suitable linear units illustrated in Fig. 7 as feet.

In this form the cord-operated pulleys are shown as located distant from the indicating elements. The two pulleys 70 and 71 are each provided with cylindrical flanges 72, 73 of the same diameter to receive the cord in helical form. These pulleys rotate on suitable supports 74 shown as carried on the front section 2 of the vehicle at the rear of the driver's seat but may, of course, be located in any suitable position. In this construction there is also a direct driving connection between each pulley and its corresponding indicating element, the flexible shaft 67 driving the disk 60 being connected axially to the pulley 70 and the flexible shaft 68 driving the disk 61 being connected axially to the pulley 71. The cord 75 is attached to and wound around the flange of the pulley 70 and the cord 76 is attached to and wound around the flange of the pulley 71 so that when these cords are pulled and held taut, the corresponding pointers 62 of the indicating elements will rotate or have an angular movement depending upon the extent to which the cords are pulled and thus the pulleys are rotated. Thus again when the cords are pulled out to the same extent, there will be no change in the relative angular position of the pointers, while if they are pulled to an unequal extent, the differential will be indicated by the change in the relative angular position of the pointers. In this form both pointers read on the same calibrated linear units on the annulus 58, thus indicating respectively the length to which the end of the cord is pulled out. Suitable take-up means are provided to effect reverse rotation of the pulleys and thereby of the indicating means and thus enable the cords to remain taut. For that purpose in the construction illustrated levers 77 are fulcrumed at 78 at suitable points, as at the rear of the driver's seat. These levers are weighted at 79 at one end and at the other connected by cords 80 to and extend around small pulleys 81 rigid with and rotating with the main pulleys 70 and 71.

In the case of both forms of the invention illustrated, the operating cords are shown as leading through tubular guides 82 from which they are pulled out laterally and in opposite directions. With the indicator mounted upon a vehicle as shown, these tubular guides 82 are mounted vertically one on each side of the yoke 8 and in alignment with the central vertical axis on which the front body section turns. The cords, as in the case of the second form illustrated, pass around suitable guides 83 to the tubular guides. In order to assist in maintaining the cords pulled out laterally in transverse alignment with the central vertical axis, guide rods 84 are mounted upon and project laterally from the yoke 8 in transverse alignment with the tubular guides 82.

Thus it will be seen in either case that when the cords are extended laterally of the indicator and held taut with the indicating elements in a predetermined angular relation, any lateral shift of the indicator with respect to the cord ends will be indicated by a change in said angular relation and so long as the cords are maintained pulled out to the same extent, there will be no change in the angular relation of the indicating elements and thus the position of the indicator with respect to the ends of the cords will remain unchanged. And in both cases the distance of the indicator from the end of each cord is indicated by the position of the corresponding pointer or indicating element on the calibrated annulus.

With the indicating mechanism embodied in a vehicle as illustrated for making a mark or painting a stripe, the ends of the cords are held by men and carried along as close as possible to the side edges of the roadway and if, for example, the line is to be laid midway of the roadway, the driver of the vehicle simply has to steer it so as to keep the indicating elements in alignment and any lateral shift of the front wheels away from the required position will be indicated by angular separation of the indicating elements.

Having thus described the invention, what is claimed as new, and desired to be secured by Letters Patent, is:

1. Indicating mechanism comprising an indicator, two pulleys, each having a cylindrical flange of the same diameter, a shaft, the said pulleys mounted the first to rotate with the shaft and the second with respect to the shaft, an annulus at one side of the second pulley, a dial mounted to rotate in parallelism with the pulleys and having an annulus on its face a segment of which extends radially beyond the first annulus, a driving connection between the shaft and the dial, the said annuluses calibrated on their faces in linear units corresponding to the units of the circumferential length of the flanges of the pulleys, two cords respectively attached to, and wound around the flange of, said pulleys and acting when pulled to rotate the respective pulleys, take-up means acting to effect reverse rotation of the pulleys whereby when the cords are extended laterally of the indicator and held taut the length of each cord pulled out will be indicated on the associated annulus and a differential of the said lengths wil be indicated by the angular relation of the pointers.

2. Indicating mechanism for a vehicle for indicating a relative lateral position of the vehicle with respect to the sides of the roadway, said vehicle having a front section mounted to turn on a central vertical axis comprising cord guides on said front section extending in transverse alignment with said axis at opposite sides thereof, an indicator mounted on said front section having two indicating elements superimposed and rotatably mounted on a common center, two pulleys each having a cylindrical flange, driving connections between one pulley and one indicating element and between the other pulley and the other indicating element acting to effect angular movement of the indicating elements, two cords one attached to, and wound around the flange of, one pulley and the other attached to, and wound around the flange of, the other pulley and extended respectively through said guides and to the corresponding road edge and acting when pulled to rotate the respective pulleys and thereby the associated indicating elements, and take-up means acting to effect reverse rotation of the pulleys and thereby of the indicating elements, whereby the position of said axis with respect to the cord ends when the cords are pulled taut in alignment with the guides will be indicated by the indicating elements.

3. An indicating mechanism for a vehicle for indicating a relative lateral position of the vehicle with respect to the sides of the roadway, said vehicle having a front section mounted to turn on a central vertical axis comprising cord guides on said front section extending in transverse alignment with said axis at opposite sides thereof, an indicator mounted on said front section and having two indicating elements superimposed and rotatable on a common center, two cord-operated means connected respectively one to each indicating element and with the cords extended respectively through said guides and to the corresponding road edge and each means acting when its cord is pulley to rotate its indicating element through the same angle and in the same direction for the same length of cord pulled, and take-up means acting to effect reverse rotation of the indicating elements, whereby when the cords are extended laterally in alignment with said guides and held taut with the indicating elements in a predetermined angular relation, any lateral shift of the said axis with respect to the cord ends will be indicated by a change in said angular relation.

4. An indicating mechanism for a vehicle for indicating a relative lateral position of the vehicle with respect to the sides of the roadway, said vehicle having a front section mounted to turn on a central vertical axis comprising cord guides on said front section extending in transverse alignment with said axis at opposite sides thereof, an indicator mounted on said front section and having two indicating elements superimposed and rotatable on a common center, two cord-operated means connected respectively one to each indicating element with the cords thereof extended respectively through said guides and to the corresponding road edge, the said means acting when the cords are pulled in alignment with said guides to the same extent to effect equal amounts of angular movement in the same direction of the indicating elements and thus maintain them in alignment and when pulled different extents to effect proportional corresponding angular movements of the indicating elements and thus to indicate either maintenance or change of the relative position of the said axis with respect to the cord ends, and take-up means acting to effect reverse rotation of the indicating elements.

5. Indicating mechanism for a vehicle for indicating a relative lateral position of the vehicle with respect to the sides of the roadway, said mechanism comprising an indicator having two indicating elements superimposed and rotatably mounted on a common center, two pulleys each having a cylindrical flange, driving connections between one pulley and one indicating element and between the other pulley and the other indicating element acting to effect angular movements of the respective indicating elements, two cords one attached to, and wound around the flange of, one pulley and the other attached to, and wound around the flange of, the other pulley, the said cords acting when pulled to rotate the respective pulleys and thereby the associated indicating elements, take-up means acting to effect reverse rotation of the pulleys and thereby of the indicating elements, and guiding means for positioning the cords laterally of the indicator and extended therefrom in opposite directions to the corresponding road edge.

6. Indicating mechanism comprising an indicator, two pulleys mounted to rotate on a common axis and each having a cylindrical flange with the said flanges of the same diameter, two annuluses on the indicator one associated with and rotatable with each pulley and each calibrated on its face in linear units, two superimposed indicating pointers respectively connected to and rotatable with said pulleys, two cords attached to and wound respectively one around the flange of each pulley and acting when pulled to rotate their respective pulleys and thereby the associated annuluses, and take-up means acting to effect reverse rotation of the pulleys.

ROMEO A. BOSSI.